Figure 1:
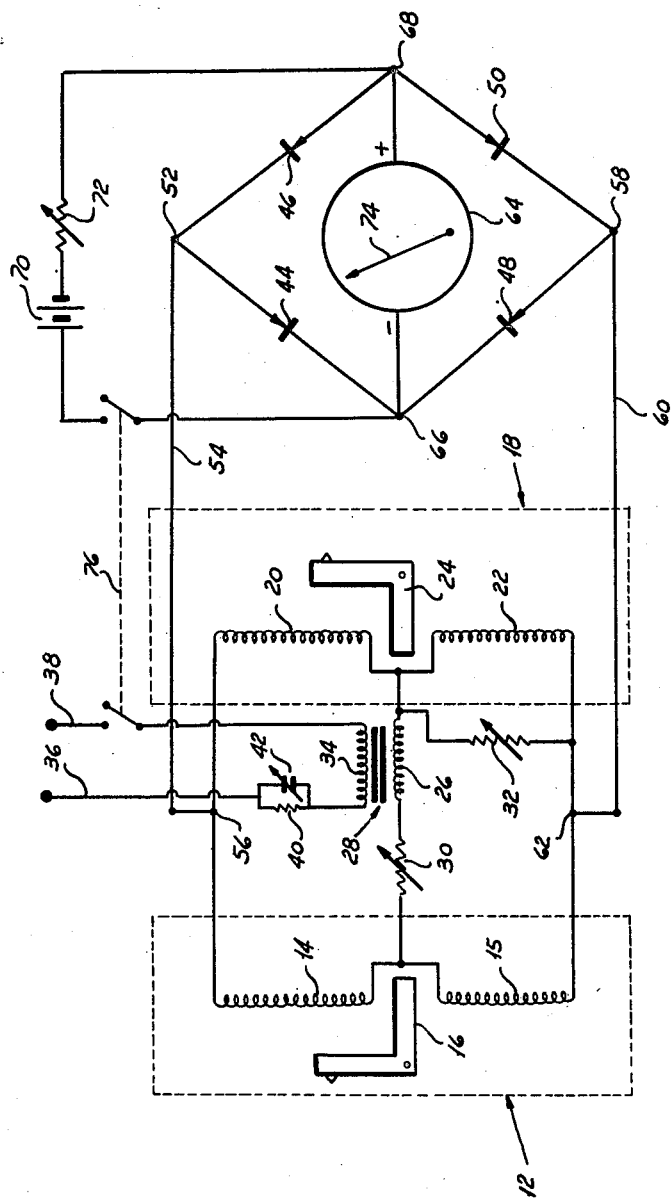

April 20, 1954  B. L. MIMS  2,675,621
COLLATING GAUGE

Filed May 5, 1948  6 Sheets-Sheet 1

INVENTOR.
BRUCE L. MIMS
BY
Henry L. Shevier
ATTORNEY

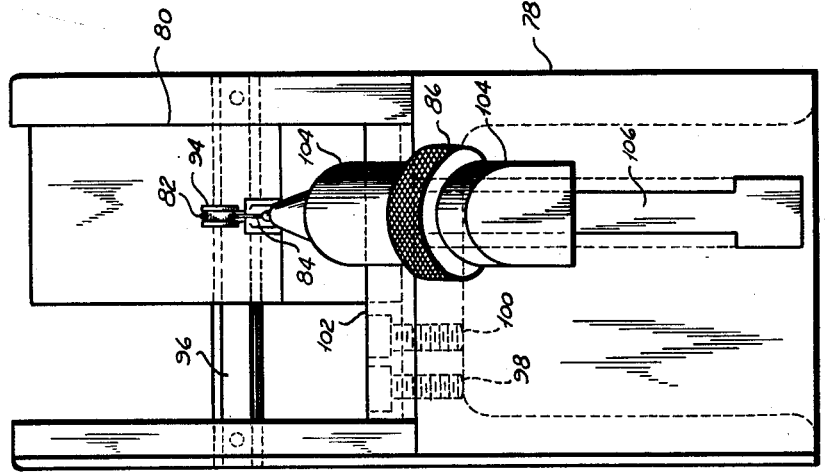
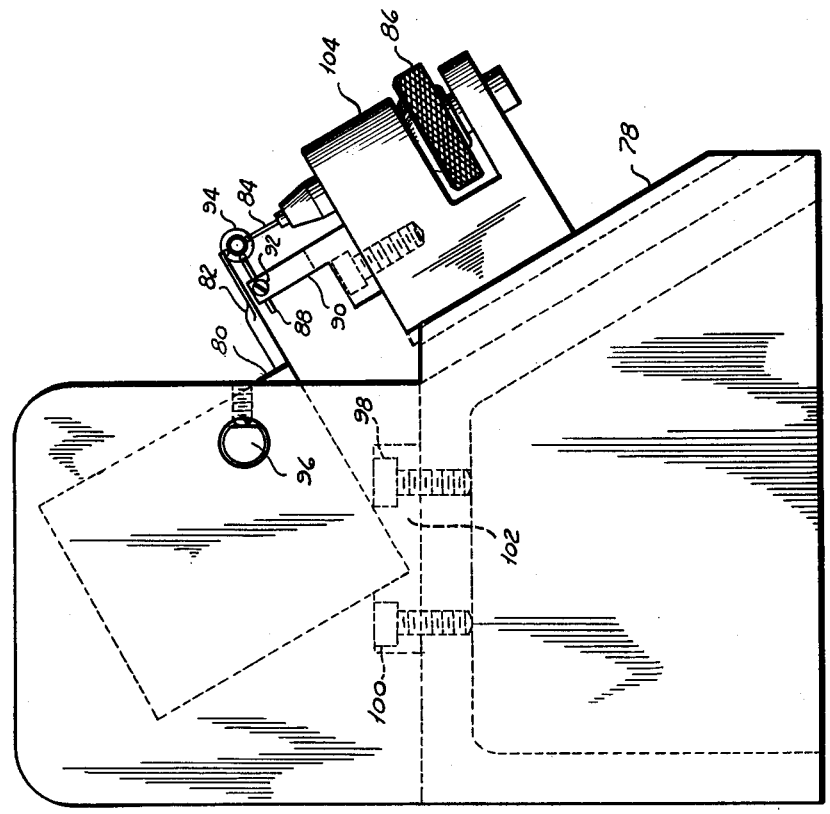

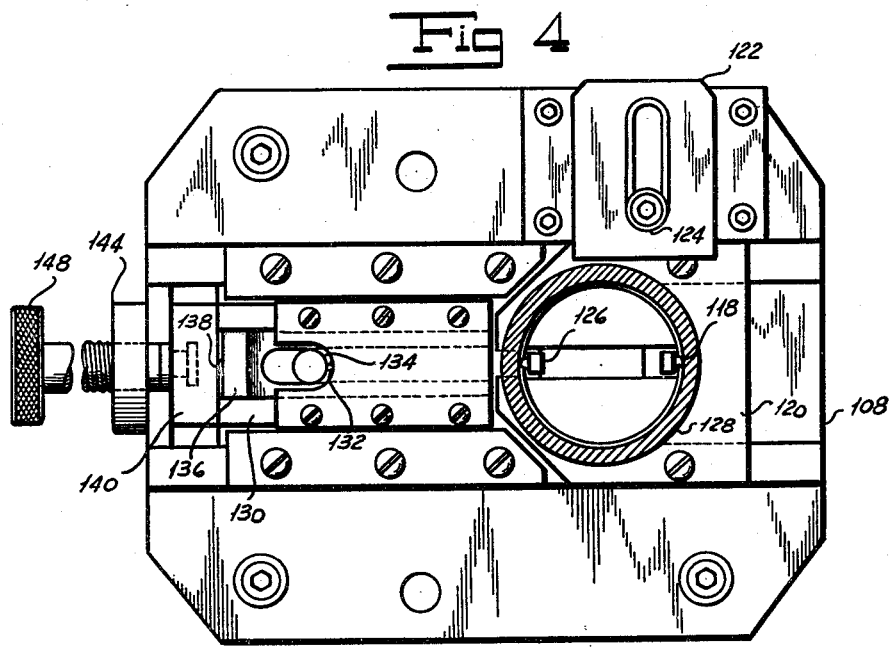
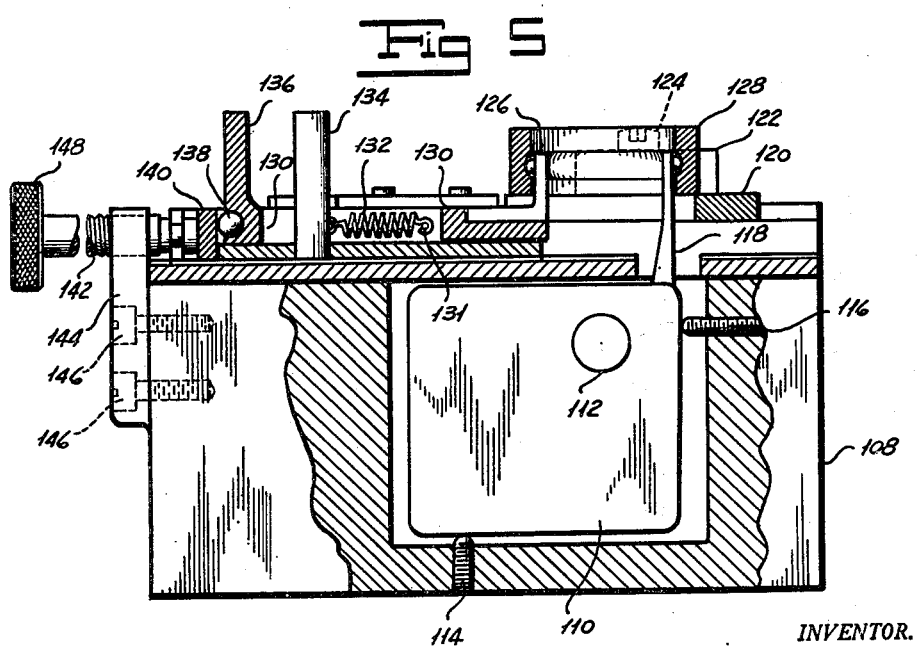

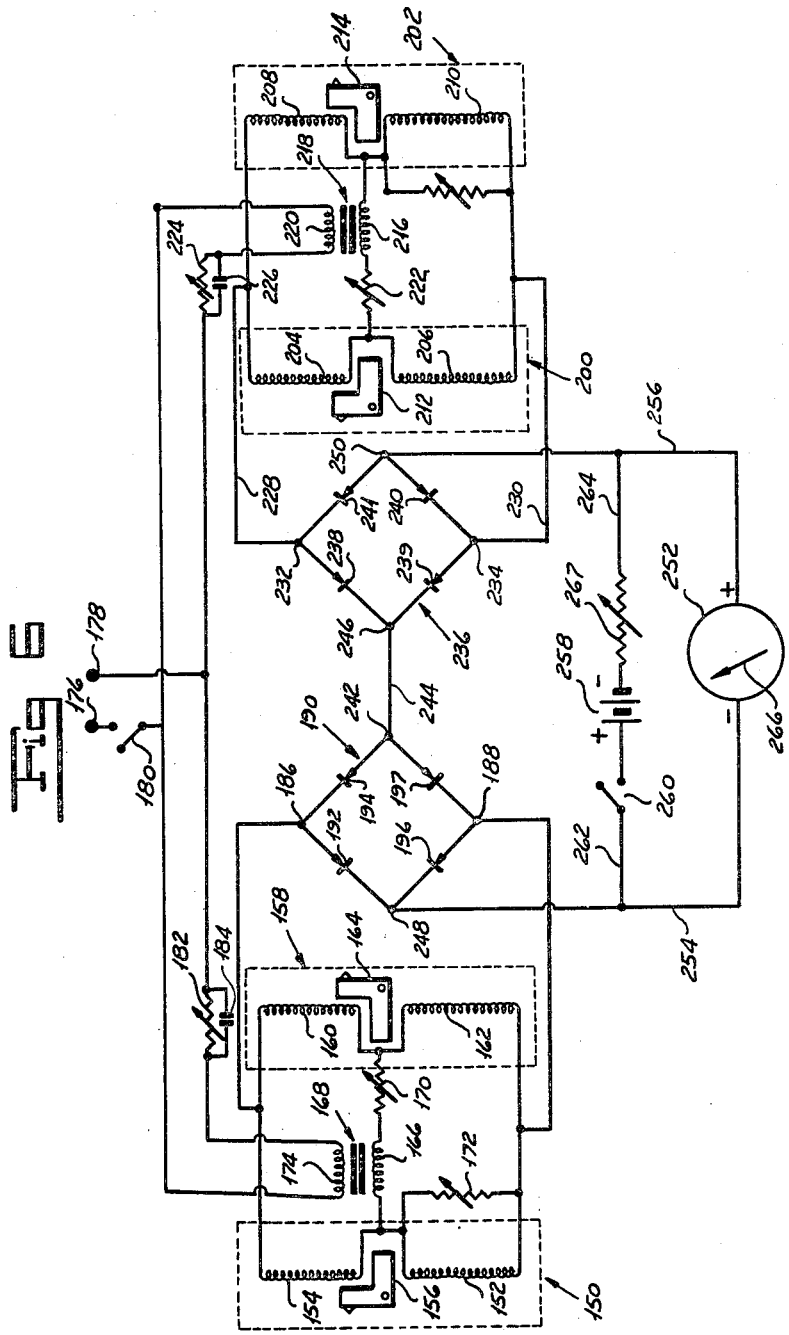

April 20, 1954      B. L. MIMS      2,675,621
COLLATING GAUGE
Filed May 5, 1948      6 Sheets-Sheet 5
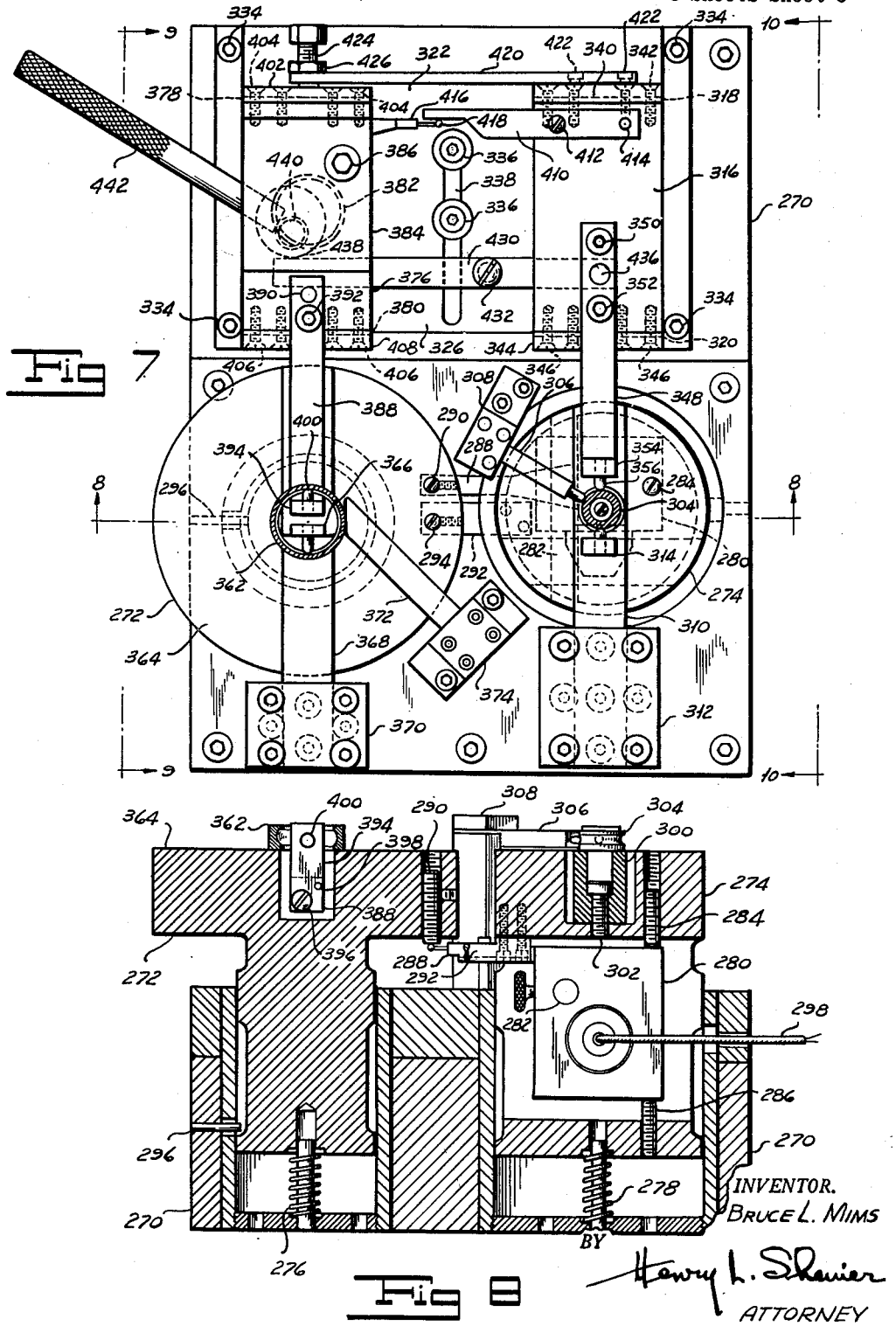
INVENTOR.
BRUCE L. MIMS
BY
Henry L. Shavier
ATTORNEY

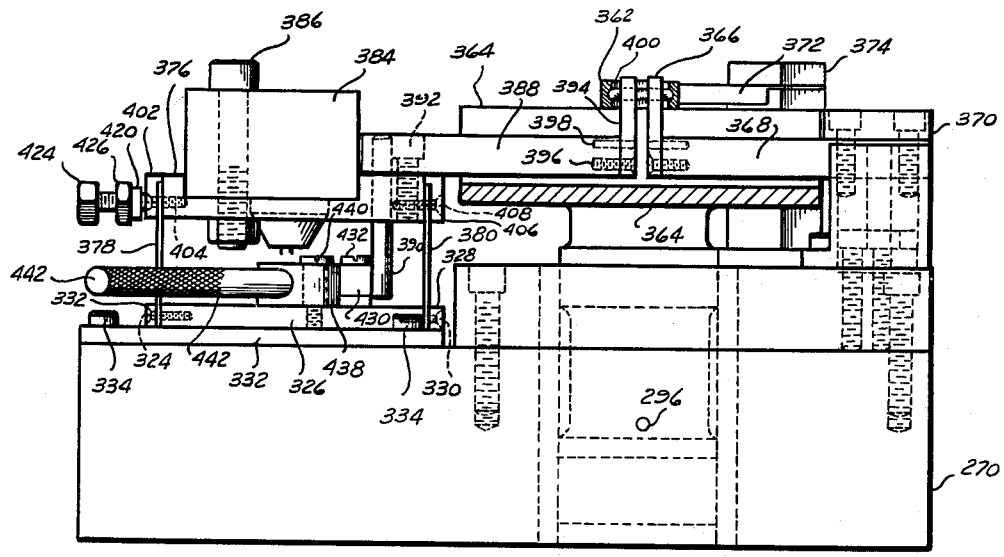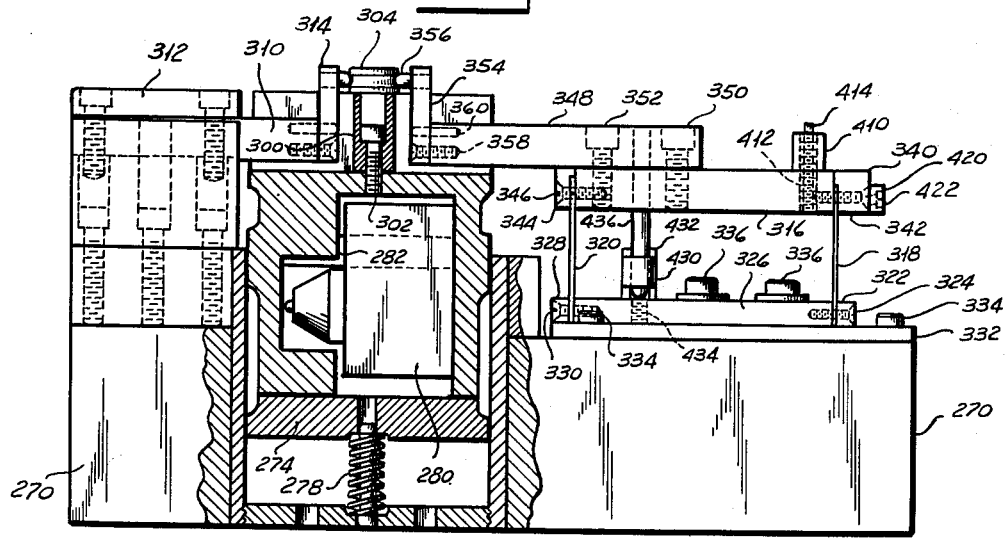

Patented Apr. 20, 1954

2,675,621

UNITED STATES PATENT OFFICE 2,675,621

COLLATING GAUGE

Bruce L. Mims, Danbury, Conn., assignor to The Barden Corporation, Danbury, Conn., a corporation of Connecticut Application May 5, 1948, Serial No. 25,290

16 Claims. (Cl. 33—147)

My invention relates to a collating gauge and more particularly to a gauge whereby I may critically compare two dimensions and readily ascertain their difference. For example, I may compare the dimension of the inner race of a ball bearing with the dimension of the outer race and thus immediately obtain the size of the ball which should be used with the races to give the proper radial clearance.

In the prior art, it is customary to measure the diameter of the inner race groove and then measure the diameter of the outer race groove. If the gauge used for the measuring is accurate to .00025", the error in the radial clearance may be as much as .0005" inasmuch as the error in measurement of each grove separately may be in the same direction.

Similarly, in fitting a wrist pin into a cylinder, if the measurement of the diameter of the wrist pin and the diameter of its hole is taken separately, the actual clearance may be in error double the amount of the individual error of each measurement.

In ball bearings, there is not only a radial load perpendicular to the axis of the rotating shaft supported by the bearing, but there always exists to some degree an axial thrust. Ball bearings are designed so that, with the contemplated axial thrust, the side faces of the race rings on one side of the bearing will be flush with each other under thrust conditions. This is accomplished by taking into consideration the radial clearance and the location of the race grooves from the side face of the race rings such that, for a given transverse shape of the race and a given radial play, the locations of the race grooves will be such that under the designed thrust the side faces of the race rings on one side of the bearing will be flush with each other. The art refers to the amount of axial thrust for which the bearing is designed as "preload." As pointed out above, preload varies with radial play and with groove location though not in the same ratio. With a given inner race and a given outer race, the preload can be varied by a variation in the ball size and within limits various preloads may be obtained by the use of various ball sizes.

In the prior art, it would be necessary to determine the ball size first by measuring the race diameter of the inner race, the race diameter of the outer race and then taking into consideration the location of the race grooves, that is, their displacement from a central plane passing through the bearing at right angles to its axis.

From these four measurements, the proper ball size can be determined to give the proper radial clearance under the desired preload. It will be seen that if the gauges used for determining these measurements are capable of measuring to an accuracy of .00025" that the tolerance of the final bearing could not safely be guaranteed with greater precision than .001" due to the fact that all of the errors may be in the same direction and thus be cumulative.

One object of my invention is to provide a collating gauge which will measure directly the difference in dimension between any two dimensions either of the same or different objects.

Another object of my invention is to provide an improved collating gauge which can be used to measure the aggregate effect of a plurality of measurements.

Another object of my invention is to provide a gauge which will determine directly the proper size of ball for ball bearings which should be used to give the desired radial fit with any combination of inner and outer races.

Other and further objects of my invention will appear from the following description.

In the accompanying drawings which form part of the instant specification and which are to be read in conjunction therewith and in which like reference numerals are used to indicate like parts in the various views, Figure 1 is a diagrammatic view showing an electrical circuit used in one embodiment of my invention in which two measurements are collated electrically, Figure 2 is a side elevation of a gauge for obtaining the measurement of the diameter of the groove of the inner race of a ball bearing to be used in the circuit shown in Figure 1, Figure 3 is a front elevation of the gauge shown in Figure 2, Figure 4 is a top plan view of a gauge for measuring the diameter of the groove of the outer race of a ball bearing, which measurement is electrically collated with the measurement of the diameter of the inner race in the circuit shown in Figure 1, Figure 5 is a side elevation of the gauge shown in Figure 4 with parts in section, Figure 6 is a diagrammatic view of an electrical circuit for collating four measurements simultaneously to achieve a single desired measurement which will coact properly with the four measurements involved, Figure 7 is a top plan view of another embodiment of my invention in which two pairs of coacting measurements are collated mechanically and the two results adapted to be collated electrically in a circuit similar to that shown in Figure 1, Figure 8 is a sectional view taken on the line 8—8 of Figure 7, Figure 9 is a side elevation with parts in section taken along the line 9—9 of Figure 7, Figure 10 is a side elevation with parts in section taken along the line 10—10 of Figure 7.

In general, the basic electrical circuit for use in my invention comprises at least two variable impedance heads of the type commercially available, such as the Pratt and Whitney "Electrolimit" head. The electrolimit head is a comparator that will measure under shop or production conditions up to accuracies of .000005". It consists generally of a spindle with which the work to be measured is brought into contact. The spindle actuates an armature which floats midway between a pair of electromagnetic coils. The coils are so adjusted that the current is balanced when the armature is positioned centrally between them. The movement of the spindle in contact with the work to be measured produces a movement in the armature. This movement unbalances the magnetic fields and produces a corresponding unbalance in the current flowing in the coils. The amount of unbalance which is a function of the change of position of the spindle is read upon a microammeter, the scale of which is calibrated in decimals of an inch suitable to the character of the work being measured.

My invention embodies the use of two balanced differential alternating circuits each opposing the other in such a way that the difference is rectified and produces a deflection on a direct current meter which is suitably calibrated in linear measure. The two components further can be opposed in predetermined different proportions if desired by appropriate adjustments on one or both sides of a bridge. In the prior art, one variable impedance head is opposed on the other side of a bridge by a fixed or adjustable impedance. In my invention, both sides of the bridge use variable impedance heads.

Referring now to Figure 1, a variable impedance head is indicated generally by the reference numeral 12. It comprises an electromagnetic coil 14 and an electromagnetic coil 15, midway between which is pivoted an armature 16. A second variable impedance head is indicated generally by the reference numeral 18 and comprises an electromagnetic coil 20 and an electromagnetic coil 22, between which an armature 24 is movably positioned. Coils 14 and 20 are connected in series across the secondary winding 26 of a transformer indicated generally by the reference number 28. Coils 15 and 22 are connected in series across the secondary winding 26 of the transformer 28. A variable resistor 30 is connected in series with the secondary winding 26 to provide for a sensitivity adjustment. A variable resistor 32 is connected in parallel with the winding 22 to provide for a ratio adjustment in event it is desired to vary the effect of the measurement made by armature 24. This adjustment is optional. The primary winding 34 of the transformer 28 is connected across a pair of conductors 36 and 38 which are adapted to communicate with a source of alternating potential. A phase shifting network comprising resistor 40 and a variable capacitor 42 is provided. Rectifiers 44, 46, 48 and 50 are connected to form a Wheatstone bridge. Terminal 52 of the bridge is connected by conductor 54 to a point 56 between windings 14 and 20 of the variable impedance heads 12 and 18. The opposite terminal 58 of the bridge is connected by conductor 60 to a point 62 between windings 15 and 22 of the variable impedance heads 12 and 18. A microammeter 64 is connected across the other terminals 66 and 68 of the bridge. A source of direct current potential, such as a battery 70 is connected across the microammeter 64 through a variable resistor 72. Adjustment of the value of the resistor 72 will adjust the zero point of the pointer 74 of the microammeter 64. A double pole switch 76 is adapted to energize the primary winding 34 and to connect the potential 70 to the microammeter 64.

For purposes of illustration and not by way of limitation, I will describe my gauge as applied to determining the ball size of a ball bearing by collating the groove diameters of the inner and outer races. Referring now to Figure 2, a base 78 carries a variable impedance head 80, the armature of which is controlled by a spindle 82. A bearing spindle 84, controlled by the micrometer screw 86, and a bearing spindle 88, carried by bracket 90 and controlled by set screw 92, are provided for positioning an inner race 94 of a ball bearing, the diameter of the race groove of which is to be measured. The variable impedance head 80 is carried upon a shaft 96 and rests in a plate 102 secured to the base by means of screws 98 and 100. The micrometer screw 86 is carried by a member 104 adapted to be carried by the base 78 in a slot 106. Different size bearing spindle assemblies may be placed in the slot 106 for different size races.

Referring now to Figures 4 and 5, I have shown a mounting for a variable impedance head by which the diameter of the groove of the outer race of a ball bearing is measured. It comprises a housing 108 in which a variable impedance head 110 is carried by shaft 112. A pair of adjusting screws 114 and 116 control the position of the body of the head and the initial position of the measuring spindle 118. The outer race ring 128 is adapted to rest upon a table 120. An adjustable stop member 122, adapted to be secured in position by a bolt 124, and an adjustable stop member 126 govern the position of an outer race 128, the groove diameter of which is to be measured. The adjustable stop 126 is secured to a slide 130, to which is secured by pin 131 one end of a spring 132, the other end of which is secured to a post 134. The slide 130 is formed with an upstanding portion 136 so that when post 134 and portion 136 are squeezed the slide 130 will move to the right against the action of spring 132, permitting the outer race 128 to be easily removed from its position. A ball 138 is seated in the bottom of slide 130 and abuts against a stop member 140, the position of which is governed by a screw 142, threaded in a bracket 144 which is carried by the housing 108 through screws 146. Rotation of the knurled knob 148 varies the position of the stop member 140.

The output of the head 110 of Figures 4 and 5 and the output of the head 80 of Figures 2 and 3 are connected in the circuit shown in Figure 1 and the microammeter 64 will give the size of the ball which should be used for the inner and outer races in position in the assemblies shown in Figures 2 and 4.

Referring now to Figure 6, I have shown a circuit in which I am enabled to obtain a net result from four variables, namely, the outer race groove diameter, inner race groove diameter, outer race groove location and the inner race groove location. A variable impedance head, indicated generally by the reference numeral 150, is provided with an electromagnetic winding 152 and electromagnetic winding 154, between which there is positioned an armature 156. A second variable impedance head, indicated generally by the reference numeral 158, has a pair of windings 160 and 162, between which there is positioned an armature 164. Windings 154 and 160 are connected in series across the secondary winding 166 of a transformer indicated generally by reference numeral 168. A variable resistor 170 provides a sensitivity adjustment. A variable resistor 172 is provided to vary the ratio of sensitivity between heads 150 and 158. The ratio may be varied in accordance with a predetermined function or may be used to bring the sensitivity to the same level. It frequently happens that due to small differences in different heads, sensitivities may not be exactly the same. The shunting of a variable resistor across one or more windings of either head, as in the case of resistor 172, can be used for equalizing the sensitivities of the heads. Alternating potential is supplied to the primary winding 174 of the transformer 168 from a suitable source connected across points 176 and 178. Switch 180 is adapted to control the energization of the primary winding 174. A variable resistor 182 shunted across a capacitor 184 is adapted to make an adjustment in the phase of the potential impressed across the primary winding 174. The heads 150 and 158 are connected in opposition and the resultant output is impressed across the terminals 186 and 188 of a Wheatstone bridge, indicated generally by the reference numeral 190. Rectifiers 192, 194, 196 and 197 are connected in the four arms of the bridge as shown. A second pair of variable impedance heads, indicated generally by the reference numerals 200 and 202, are provided with windings 204, 206, 208 and 210. An armature 212 is positioned between windings 204 and 206. An armature 214 is positioned between windings 208 and 210. The windings 204 and 208 are connected in series across the secondary winding 216 of a transformer, indicated generally by the reference numeral 218. The primary winding 220 is connected to the alternating potential source 176, 178. A variable resistor 222 controls the sensitivity of the heads 200 and 202. A variable resistor 224 connected across a capacitor 226 in the potential source to the primary winding 220 is adapted to vary the phase of the alternating potential. The heads 200 and 202 are connected in opposition and their output is impressed by conductors 228 and 230 across the terminals 232 and 234 of a second Wheatstone bridge, indicated generally by the reference numeral 236. The arms of the bridge 236 are comprised by rectifiers 238, 239, 240 and 241. The armature 156 may measure the inner race groove diameter. The armature 164 may measure the outer race groove diameter. The armature 212 may measure the inner race groove location and the armature 214 may measure the outer race groove location. The terminal 242 of the bridge 190 is connected by conductor 244 to the terminal 246 of the bridge 236. The terminal 248 of the bridge 190 and the terminal 250 of the bridge 236 are connected across a microammeter 252 by conductors 254 and 256. A battery 258 is placed across the microammeter 252 by means of a switch 260 and conductors 262 and 264. A variable resistor 267 provides an adjustment for the zero point of the pointer 266 of the microammeter 252. The microammeter may be calibrated in ball size to give the desired preload with the rings employed.

In Figure 6, I have shown the use of four separate variable impedance heads to determine the ball size which will give the proper preload using random outer and inner rings.

I may accomplish the same result with the use of two heads by means of the structure shown in Figures 7, 8, 9 and 10 to which reference is now had. The base member 270 houses a pair of pistons 272 and 274. A piston 272 is normally urged upwardly by a spring 276. The piston 274 is urged upwardly by a spring 278. The piston 274 carries a variable impedance head 280 carried by shaft 282 mounted in the piston. Screws 284 and 286 govern the position of the measuring spindle 288 which makes contact with an adjustable screw 290 carried by the piston 272. A stop member 292 secured to the piston 274 contacts a screw 294 and prevents the piston 274 from moving upwardly more than a predetermined distance. A stop pin 296 carried by the base 270 limits the upward motion of the piston 272. The cable 298 houses the conductors leading to the variable impedance head 280. A bushing 300 secured to the piston 274 by means of a screw 302 forms a support for an inner race 304. A positioning arm 306 is carried by a bracket 308 secured to the housing 270. An arm 310 is carried by a plate 312 secured to the base 270. The arm 310 carries a fixed stop 314 between which and positioning arm 306 an inner race 304 is adapted to be positioned. A plate 316 is mounted upon a pair of leaf springs 318 and 320 as can readily be seen by reference to Figure 10. Leaf spring 318 is clamped by strip 322 and screws 324 to a plate 326. Leaf spring 320 is clamped by strip 328 and screws 330 to the plate 326. The plate 326 is secured to a plate 332 which is secured to the base 270 by means of screws 334. The plate 326 is secured to the plate 332 by means of screws 336 which are positioned in a slot 338 and the arrangement is such that by loosening the screws 336 the plate 326 may be moved backward and forward to allow for bearings of different sizes. The upper end of leaf spring 318 is secured to the plate 316 by a strip 340 and screws 342. The upper end of leaf spring 320 is secured to the plate 316 by means of strip 344 and screws 346. An arm 348 is carried by the plate 316 by means of screws 350 and 352. A bracket 354 carrying a feeler point 356 is secured to the arm 348 by means of screw 358 and dowel pin 360 as can readily be seen by reference to Figure 10. The springs 318 and 320 will urge the movable feeler point 356 into engagement with the groove of the inner race 304 held in position between stationary stop 314 and positioning arm 306. An outer race 362 rests upon the upper surface 364 of the plunger 272 as can readily be seen by reference to Figure 8. A stationary stop 366 is carried by an arm 368 secured to a bracket 370 carried by the base member. A positioning stop 372 is carried by a bracket 374 as can readily be seen by reference to Figure 7. A plate 376 is carried by a pair of leaf springs 378 and 380 as can readily be seen by reference to Figures 7 and 9. The lower end of leaf spring 380 is held by strip 328 and screws 330 as in the case of leaf spring 320. The lower end of leaf spring 378 is held by strip 332 and screws 324 as in the case of leaf spring 318. The plate 376 is provided with an opening 382 in which a variable impedance head 384 is adapted to seat. The head is secured to the plate 376 by means of a bolt 386. An arm 388 is secured to the plate 376 by means of pin 390 and screw 392. The arm 388 carries a member 394 secured thereto by means of screw 396 and dowel pin 398. The upper end of member 394 carries a movable feeler point 400 adapted to contact the groove of the outer race as can readily be seen by reference to Figures 7 and 9. The springs 378 and 380 urge the plate 376 and hence the arm 388 to the left as viewed in Figure 9. The upper end of spring 378 is secured to the plate 376 by means of a strip 402 and screws 404. The upper end of spring 380 is secured to the plate 376 by means of strip 406 and screws 408. The plate 316 carries an arm 410 secured to it by means of screw 412 and dowel pin 414. The spindle 416 of the variable impedance head 384 is provided with a feeler 418 which contacts the arm 410 as can readily be seen by reference to Figure 7. A stop arm 420 is secured to the plate 316 by means of screws 422. The stop arm 420 is provided with an adjustable stop screw 424 provided with a lock nut 426. The springs 378 and 380 urge the plate 376 upwardly as viewed in Figure 7 and to the left as viewed in Figure 9. The springs 318 and 320 urge the plate 316 downwardly as viewed in Figure 7 and to the left as viewed in Figure 10. The function of the stop bolt 424 is to limit the deflection of the plates 376 and 316 when no race rings are in the device.

A lever 430 is pivoted to the plate 326 around pivot 432, the lower end of which is provided with screw threads 434 for threaded engagement with the plate 326. The end of lever 430 carries a rod 436 which extends upwardly through the plate 316 and through the arm 348 as can readily be seen by reference to Figures 7 and 10. The lower end of pin 390 carried by the arm 388 engages the other side of lever 430 as can readily be seen by reference to Figures 7 and 9. An eccentric 438 is pivoted about a pin 440 carried by the plate 326. The eccentric contacts the end of lever 430 on the side opposite pin 390 as can readily be seen by reference to Figures 7 and 9. The eccentric 438 is provided with a handle 442. Upon the rotation of the handle 442 downwardly as viewed in Figure 7 and to the right as viewed in Figure 9, the lever 430 will be rotated in a counterclockwise direction as viewed in Figure 7, moving the arm 388 downwardly by means of pin 390 against the action of springs 378 and 380 and moving the arm 348 upwardly against the action of springs 318 and 320 thus permitting the outer race 362 and the inner race 304 to be readily removed or inserted. When the lever 442 is moved to the position shown in Figure 7, the lever 430 will rotate in a clockwise direction under the influence of the springs to permit the feeler points 400 and 356 to make contact with the races positioned on plungers 272 and 274. It will be seen that the position of spindle 416 of the variable impedance head 384 is governed by the combined positions of plates 376 and 316. The position of these plates in turn will govern arms 388 and 348 carrying feelers 400 and 356. The comparison between the diameter of the inner and outer race grooves in the form of invention as shown in Figures 7, 8, 9 and 10 is made mechanically and the result of the comparison is measured by the means of a variable impedance head. It will be seen further that the location of the race groove in outer race 362 is compared with the location of the race groove in inner race 304 mechanically. The difference in the location of the race grooves is indicated by the relative displacement of plunger 272 with respect to plunger 274. The displacement in turn is measured electrically through the feeler 288 of the variable impedance head 280. The output signals from the two variable impedance heads may then be compared electrically in a circuit shown in Figure 1, in which case the microammeter 64 will indicate the ball size which will give the proper preload for the inner and outer rings placed in the device.

It will be seen that I have accomplished the objects of my invention. I have provided a collating gauge which will measure directly the difference in dimensions between any two dimensions of either of the same or different objects. I have provided an improved collating gauge which can be used to measure the aggregate effect of a plurality of dimensions and which will determine directly the proper size of a ball for ball bearings which should be used to give the desired radial fit with any combination of inner and outer races. I have provided a collating gauge in which the error of taking individual measurements is reduced by measuring a comparison directly.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A collating gauge including in combination two pairs of reactors connected in a bridge circuit, a movable armature adapted to vary the impedance of one of the first pair of reactors, means responsive to displacement from a predetermined point for moving the armature, a second armature movable independently of said first armature adapted to vary the impedance of one of the second pair of reactors, means responsive to displacement from another predetermined point for moving the second armature, an alternating potential source, means for connecting said alternating potential source across one pair of terminals of the bridge circuit and a galvanometer calibrated as a function of distance connected across the other terminals of the bridge circuit.

2. A collating gauge including in combination two pairs of reactors connected in a bridge circuit, a movable armature adapted to vary the impedance of one of the first pair of reactors, means responsive to displacement from a predetermined point for moving the armature, a second armature movable independently of said first armature adapted to vary the impedance of one of the second pair of reactors, means responsive to displacement from another predetermined point for moving the second armature, an alternating potential source, means for connecting said alternating potential source across one pair of terminals of the bridge circuit, a bridge rectifier, means for connecting one pair of terminals of the bridge rectifier across the other pair of terminals of the bridge circuit and a galvanometer calibrated as a function of distance connected across the other two terminals of the bridge rectifier.

3. A collating gauge as in claim 2 including in combination means for varying the relative impedance of one of a pair of reactors.

4. A collating gauge as in claim 2 including in combination, a variable impedance connected in series with the alternating potential source to provide a sensitivity adjustment.

5. A collating gauge as in claim 2 in which said alternating potential source includes the secondary winding of a transformer, the primary winding of which is connected to an alternating current potential through a phase-shifting network.

6. A collating gauge as in claim 2 in which the reactors comprise inductors.

7. A collating gauge as in claim 2 in which the reactors comprise inductors and said armatures are positioned between respective pairs of inductors.

8. A collating gauge as in claim 2 in which a controllable direct current potential is connected across the galvanometer to provide an initial point adjustment.

9. A collating gauge as in claim 2 in which said first movable armature is adapted to measure the diameter of the groove of the inner race of a ball bearing including in combination a support, means carried by said support for mounting the inner race of a ball bearing and means for carrying said movable armature to contact the groove of the inner race of a ball bearing.

10. A collating gauge as in claim 2 in which said first movable armature is adapted to measure the diameter of the groove of the inner race of a ball bearing including in combination a support, means carried by said support for mounting the inner race of a ball bearing and means for carrying said movable armature to contact the groove of the inner race of a ball bearing, said means for mounting the inner race of a ball bearing including a normally stationary feeler and a micrometer screw for adjusting the position of said feeler.

11. A collating gauge as in claim 2 in which one of said movable armatures is adapted to measure the diameter of the groove of the outer race of a ball bearing including in combination a body member, means for supporting the outer race of the ball bearing upon said body member, means for mounting one of said movable armatures for contact with the groove of the outer race of a ball bearing, and a normally stationary contact member positioned to contact the groove of the outer race of a ball bearing at a point diametrically opposite from the point of contact of said movable armature.

12. A collating gauge as in claim 2 in which one of said movable armatures is adapted to measure the diameter of the groove of the outer race of a ball bearing including in combination a body member, means for supporting the outer race of the ball bearing upon said body member, means for mounting one of said movable armatures for contact with the groove of the outer race of a ball bearing, and a normally stationary contact member positioned to contact the groove of the outer race of a ball bearing at a point diametrically opposite from the point of contact of said movable armature, said normally stationary contact point comprising a slidable member, a stop for limiting the movement of said slidable member and means for biasing said slidable member into engagement with said stop.

13. A collating gauge as in claim 2 in which one of said movable armatures is adapted to measure the diameter of the groove of the outer race of a ball bearing including in combination a body member, means for supporting the outer race of the ball bearing upon said body member, means for mounting one of said movable armatures for contact with the groove of the outer race of a ball bearing, and a normally stationary contact member positioned to contact the groove of the outer race of a ball bearing at a point diametrically opposite from the point of contact of said movable armature, said normally stationary contact point comprising a slidable member, a stop for limiting the movement of said slidable member, means for biasing said slidable member into engagement with said stop and micrometer screw means for adjusting the position of said stop.

14. A collating gauge as in claim 2 adapted to determine the ball size to be used in a ball bearing to give the proper preload with random outer and inner races including in combination a housing, a pair of members carried by said housing for vertical reciprocating motion, means for biasing said members to move upwardly, means for supporting the outer race of a ball bearing upon one of said members along a plane extending at right angles to the axis of the race, a stationary feeler supported by said housing adapted to contact the groove of said outer race, a first movable feeler, means for supporting said first movable feeler for contact with the groove of said outer race at a point diametrically opposite the point of contact of said stationary feeler, means for supporting the inner race of a ball bearing upon the other member along a plane extending at right angles to the axis of the inner race, a second stationary feeler carried by said housing adapted to contact the groove of said inner race, a second movable feeler, means for supporting said second movable feeler for contact with the groove of said inner race at a point diametrically opposite the point of contact of said stationary feeler, means for mounting said first movable armature and one of said members with said movable armature contacting the other of said members whereby to measure the relative displacement of one of said movable members from the other of said movable members to obtain a measurement which is a function of the location of the groove of the inner race with respect to the groove of the outer race.

15. A collating gauge as in claim 2 adapted to determine the ball size to be used in a ball bearing to give the proper preload with random outer and inner races including in combination a housing, a pair of members carried by said housing for vertical reciprocating motion, means for biasing said members to move upwardly, means for supporting the outer race of a ball bearing upon one of said members along a plane extending at right angles to the axis of the race, a stationary feeler supported by said housing adapted to contact the groove of said outer race, a first movable feeler, means for supporting said first movable feeler for contact with the groove of said outer race at a point diametrically opposite the point of contact of said stationary feeler, means for supporting the inner race of a ball bearing upon the other member along a plane extending at right angles to the axis of the inner race, a second stationary feeler carried by said housing adapted to contact the groove of said inner race, a second movable feeler, means for supporting said second movable feeler for contact with the groove of said inner race at a point diametrically opposite the point of contact of said stationary feeler, means for mounting said first movable armature and one of said members with said movable armature contacting the other of said members whereby to measure the relative displacement of one of said movable members from the other of said movable members to obtain a measurement which is a function of the location of the groove of the inner race with respect to the groove of the outer race, said means for supporting said first movable feeler comprising a third member mounted for movement in a plane extending at right angles to the plane of movement of said first member, said means for movably mounting said second movable feeler comprising a fourth member movable in a plane at right angles to the movement of said second member, said second armature being carried by one of said last-named members and contacting the other of said last-named members whereby the relative displacement of said third and fourth members may be measured to give the difference in the diameter of the outer groove and the diameter of the inner groove, said galvanometer being calibrated in ball size to give the desired preload with the inner and outer races being collated.

16. A collating gauge including in combination two pairs of inductors connected in a first bridge circuit, a first movable armature adapted to vary the impedances of said inductors positioned between the first pair of inductors, a second movable armature adapted to vary the impedances of said second pair of inductors positioned therebetween, a first bridge rectifier, an alternating potential source, means for connecting the alternating potential source across one pair of terminals of the bridge circuit, means for connecting the other pair of terminals of said first bridge circuit across the first pair of terminals of said first bridge rectifier, a second bridge circuit comprising two pairs of inductors, a third armature adapted to vary the impedances of the inductors movably positioned between one pair of said inductors, a fourth armature movably positioned between the other pair of the inductors forming said second bridge circuit, means for impressing the alternating potential source across one pair of terminals of said second bridge circuit, a second bridge rectifier, means for connecting the other pair of terminals of said second bridge circuit across the first pair of terminals of said second bridge rectifier, a conductor interconnecting one terminal of each of the second pair of terminals of the two bridge rectifiers, a galvanometer calibrated as a function of distance and means for connecting said galvanometer across the remaining two terminals of said respective bridge rectifiers.

References Cited in the file of this patent

UNITED STATES PATENTS

| Number | Name | Date |
|---|---|---|
| 2,030,237 | Brittain | Feb. 11, 1936 |
| 2,081,364 | Melas | May 25, 1937 |
| 2,122,664 | Terry | July 5, 1938 |
| 2,137,368 | Terry | Nov. 22, 1938 |
| 2,216,796 | Aller | Oct. 8, 1940 |
| 2,240,184 | Hathaway | Apr. 29, 1941 |
| 2,241,401 | Haskell | May 13, 1941 |
| 2,249,477 | Kuehni | July 15, 1941 |
| 2,266,608 | Kuehni | Dec. 16, 1941 |
| 2,266,620 | Coffman | Dec. 16, 1941 |
| 2,385,005 | Langer | Sept. 18, 1945 |
| 2,400,571 | Olesen | May 21, 1946 |
| 2,403,898 | Aller et al. | July 16, 1946 |
| 2,406,221 | Hornfeck | Aug. 20, 1946 |
| 2,407,490 | Gregg | Sept. 10, 1946 |
| 2,419,280 | Neff | Apr. 22, 1947 |
| 2,419,461 | Neff | Apr. 22, 1947 |
| 2,420,711 | Look | May 20, 1947 |
| 2,421,420 | Hathaway | June 3, 1947 |
| 2,433,421 | Bowness | Dec. 30, 1947 |
| 2,499,033 | Oberholtzer | Feb. 28, 1950 |
| 2,598,812 | Marco et al. | June 3, 1952 |
| 2,601,447 | Neff | June 24, 1952 |

FOREIGN PATENTS

| Number | Country | Date |
|---|---|---|
| 921,978 | France | May 23, 1947 |